United States Patent
Yoshioka et al.

(10) Patent No.: US 12,397,257 B2
(45) Date of Patent: Aug. 26, 2025

(54) HONEYCOMB FILTER

(71) Applicant: NGK Insulators, Ltd., Nagoya (JP)

(72) Inventors: Fumihiko Yoshioka, Novi, MI (US); Yuji Sasaki, Nagoya (JP); Yasuyuki Furuta, Konan (JP); Ritsuko Teranishi, Nagoya (JP); Ayaka Sakai, Nagoya (JP); Tatsuya Ohashi, Chiryu (JP)

(73) Assignee: NGK INSULATORS, LTD., Nagoya (JP)

( * ) Notice: Subject to any disclaimer, the term of this patent is extended or adjusted under 35 U.S.C. 154(b) by 0 days.

(21) Appl. No.: 18/177,376

(22) Filed: Mar. 2, 2023

(65) Prior Publication Data

US 2023/0347275 A1 Nov. 2, 2023

(30) Foreign Application Priority Data

Mar. 30, 2022 (JP) .................. 2022-057088

(51) Int. Cl.
*B01D 24/00* (2006.01)
*B01D 46/24* (2006.01)

(52) U.S. Cl.
CPC ............. *B01D 46/24492* (2021.08); *B01D 46/24491* (2021.08); *B01D 46/2459* (2013.01); *B01D 46/247* (2013.01); *B01D 46/2482* (2021.08); *B01D 46/249* (2021.08); *B01D 46/2494* (2021.08)

(58) Field of Classification Search
None
See application file for complete search history.

(56) References Cited

U.S. PATENT DOCUMENTS

| 2007/0119135 A1* | 5/2007 | Miao ............... C04B 35/478 55/523 |
| 2008/0032091 A1* | 2/2008 | Beall ............... C04B 35/195 428/116 |

(Continued)

FOREIGN PATENT DOCUMENTS

| JP | 2018-149510 A | 9/2018 | |
| WO | WO-2014028207 A1 * | 2/2014 | ......... B01D 39/2068 |
| WO | WO-2023176062 A1 * | 9/2023 | |

*Primary Examiner* — Mary I Omori
(74) *Attorney, Agent, or Firm* — BURR PATENT LAW, PLLC

(57) ABSTRACT

A honeycomb filter comprising a pillar-shaped honeycomb structure body having a porous partition wall and a plugging portion, wherein, in a pore diameter distribution of the partition wall, in the case where the pore diameter (μm) whose cumulative pore volume is 10% of the total pore volume is denoted by D10, the pore diameter (μm) whose cumulative pore volume is 50% of the total pore volume is denoted by D50, and the pore diameter (μm) whose cumulative pore volume is 90% of the total pore volume is denoted by D90, all of the following equations (1) to (6) are satisfied.

| $8.4\ \mu m < D10$ | (1) |
| $17.5\ \mu m < D50 < 24.0\ \mu m$ | (2) |
| $D90 < 55.2\ \mu m$ | (3) |
| $(\log D90 - \log D10)/\log D50 < 0.60$ | (4) |
| $\log D90/\log D50 < 1.30$ | (5) |
| $\log D50/\log D10 < 1.38$ | (6) |

4 Claims, 2 Drawing Sheets

(56) References Cited

U.S. PATENT DOCUMENTS

2015/0096274 A1* 4/2015 Shibata .............. B01D 46/2484
                                                                          55/502
2018/0050333 A1* 2/2018 Okazaki .............. C04B 38/0074
2018/0264453 A1* 9/2018 Kuki .................... C04B 35/584
2019/0076773 A1* 3/2019 Beall ................ B01D 46/24493

* cited by examiner

HONEYCOMB FILTER

RELATED APPLICATIONS

The present application is an application based on JP 2022-057088 filed on Mar. 30, 2022 with Japan Patent Office, the entire contents of which are incorporated herein by reference.

BACKGROUND OF THE INVENTION

Field of the Invention

The present invention relates to a honeycomb filter. More specifically, the present invention relates to a honeycomb filter which has excellent trapping performance and reduces pressure loss.

Conventionally, a honeycomb filter using a honeycomb structure has been known as a filter for trapping particulate matter in exhaust gas emitted from an internal combustion engine such as an automobile engine, or a device for purifying toxic gas components such as CO, HC, NOx (see Patent Document 1). The honeycomb structure includes a partition wall made of porous ceramics such as cordierite and a plurality of cells defined by the partition wall. A honeycomb filter includes such a honeycomb structure provided with plugging portions so as to plug the open ends on the inflow end face side and the outflow end face side of the plurality of cells alternately. In other words, the honeycomb filter has a structure in which inflow cells having the inflow end face side open and the outflow end face side plugged and outflow cells having the inflow end face side plugged and the outflow end face side open are arranged alternately with the partition wall therebetween. In the honeycomb filter, the porous partition wall serves as a filter for trapping the particulate matter in exhaust gas. Hereinafter, the particulate matter contained in exhaust gas may be referred to as "PM". The "PM" is an abbreviation for "Particulate Matter."

Exhaust gas is purified by a honeycomb filter as follows. First, the honeycomb filter is disposed such that the inflow end face side is positioned on the upstream side of an exhaust system through which exhaust gas is emitted. The exhaust gas flows into inflow cells from the inflow end face side of the honeycomb filter. Then, the exhaust gas that has flowed into the inflow cells passes through a porous partition wall, flows toward outflow cells, and is emitted from the outflow end face of the honeycomb filter. When passing through the porous partition wall, PM and the like in the exhaust gas are trapped and removed.

[Patent Document 1] JP-A-2018-149510

A honeycomb filter used to purify exhaust gas emitted from an automobile engine has been adopting, as a porous partition wall, a high-porosity porous body having high porosity. In recent years, there has been a demand for improvement in the filtration efficiency of honeycomb filters due to the tightening of automobile emission regulations and the like.

As a means for improving the filtration efficiency of a honeycomb filter, for example, a method of reducing the average pore diameter of a porous partition wall can be cited. However, the average pore diameter of the partition wall significantly influences the pressure loss of the honeycomb filter, and there has been a problem that the pressure loss of the honeycomb filter inconveniently increases when the average pore diameter of the partition wall is reduced. In addition, as a measure for suppressing an increase in pressure loss, it is conceivable to increase the porosity of the partition wall, but there has been a problem that further increasing the porosity of the partition wall inconveniently leads to lower strength of the honeycomb filter.

In addition, conventionally, the average pore diameter of the partition wall as described above is generally controlled by the measured value obtained by a mercury press-in method. A pore of a porous body such as a partition wall includes a part where the diameter of the pore is enlarged and a constricted part between the parts where the diameter of the pore is enlarged (hereinafter, also referred to as a "neck"). However, the values such as pore diameter conventionally obtained by the mercury press-in method (hereinafter, also referred to as "mercury press-in pore diameter") depend on the diameter of the neck on an inlet side of the pore, and the pore diameter inside the neck may not be accurately measured. For this reason, there has been a problem that the conventional mercury press-in pore diameter does not provide good identification of the honeycomb filter.

The present invention has been made in view of the problems with the prior arts described above. According to the present invention, a honeycomb filter which has excellent trapping performance and reduces pressure loss is provided.

SUMMARY OF THE INVENTION

According to the present invention, a honeycomb filter described below is provided.

[1] A honeycomb filter including: a pillar-shaped honeycomb structure body having a porous partition wall disposed to surround a plurality of cells which serve as fluid through channels extending from a first end face to a second end face; and a plugging portion provided at an open end on the first end face side or the second end face side of each of the cells, wherein, in a pore diameter distribution of the partition wall obtained by structural analysis, in the case where the pore diameter (μm) whose cumulative pore volume is 10% of the total pore volume is denoted by D10, the pore diameter (μm) whose cumulative pore volume is 50% of the total pore volume is denoted by D50, and the pore diameter (μm) whose cumulative pore volume is 90% of the total pore volume is denoted by D90, all of the following equations (1) to (6) are satisfied.

$$8.4 \ \mu m < D10 \tag{1}$$

$$17.5 \ \mu m < D50 < 24.0 \ \mu m \tag{2}$$

$$D90 < 55.2 \ \mu m \tag{3}$$

$$(\log D90 - \log D10)/\log D50 < 0.60 \tag{4}$$

$$\log D90/\log D50 < 1.30 \tag{5}$$

$$\log D50/\log D10 < 1.38 \tag{6}$$

[2] The honeycomb filter according to [1], wherein a porosity of the partition wall determined by structural analysis is greater than 60.0% and less than 63.5%.

[3] The honeycomb filter according to [1] or [2], wherein a thickness of the partition wall is greater than 177.8 μm and less than 254.0 μm.

[4] The honeycomb filter according to any one of [1] to [3], wherein a cell density of the honeycomb structure body is greater than 31.0 cells/cm² and less than 62.0 cells/cm²

[5] The honeycomb filter according to any one of [1] to [4], wherein the cell plugged by the plugging portion at an open end on the first end face side of the honeycomb structure body is an outflow cell, and the cell plugged by the plugging portion at an open end on the second end face side of the honeycomb structure body is an inflow cell, in a section orthogonal to the extending direction of the cell of the honeycomb structure body, a shape of the outflow cell differs from a shape of the inflow cell.

[6] The honeycomb filter according to [5], wherein the shape of the outflow cell is one of a quadrangular shape and an octagonal shape, and the shape of the inflow cell is the other of a quadrangular shape and an octagonal shape.

The honeycomb filter of the present invention has excellent trapping performance and can reduce pressure loss. That is, the honeycomb filter of the present invention is configured such that, in a pore diameter distribution of the partition wall obtained by structural analysis, the above-described values of D10, D50, and D90 satisfy all of the above equations (1) to (6).

In particular, as in the above equation (1), by setting D10 in the pore diameter distribution to be high to reduce small pores, the transmission resistivity of the partition wall is lowered, and it is possible to effectively suppress an increase in pressure loss of the honeycomb filter. In addition, as in the above equation (3), by setting D90 in the pore diameter distribution to be low to reduce large pores, it is possible to suppress a local increase in the flow rate of the fluid passing through the partition wall, and to improve the filtration efficiency of the honeycomb filter. In the honeycomb filter of the present invention, for example, when a porous partition wall is loaded with a catalyst for purifying exhaust gas, the catalyst is loaded such that the inside of pores of the partition wall is uniformly coated. By loading the catalyst in this manner, it is possible to achieve both the improvement in trapping performance and the reduction in pressure loss of the honeycomb filter that is loaded with the catalyst.

DESCRIPTION OF THE PREFERRED EMBODIMENTS

Hereinafter, embodiments of the present invention will be described, but the present invention is not limited to the following embodiments. Therefore, it should be understood that those in which modifications, improvements, and the like have been appropriately added to the following embodiments are within the scope of the present invention based on the ordinary knowledge of those skilled in the art without departing from the spirit of the present invention.

(1) Honeycomb Filter

Figure 1:
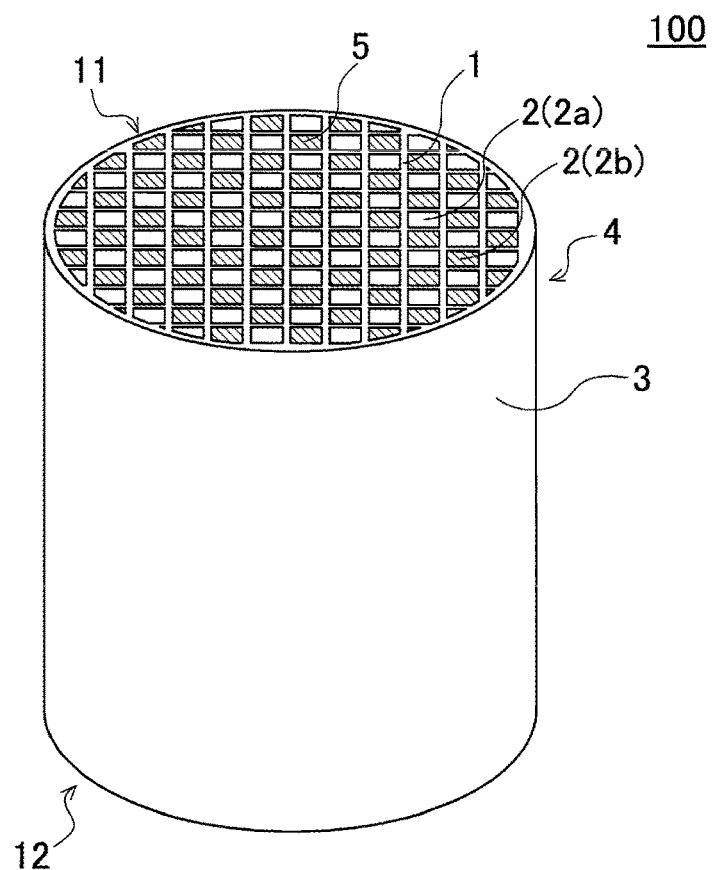
FIG. 1 is a perspective view schematically showing one embodiment of a honeycomb filter according to the present invention as viewed from an inflow end face side.
Figure 2:
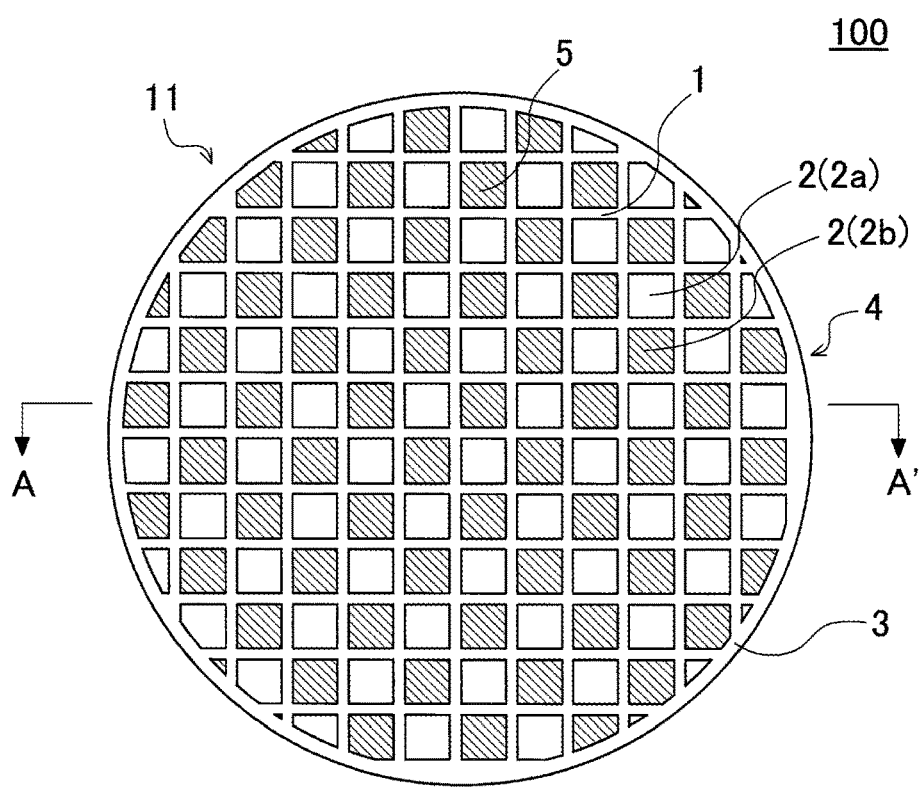
FIG. 2 is a plan view of the honeycomb filter shown in FIG. 1 as viewed from the inflow end face side.
Figure 3:
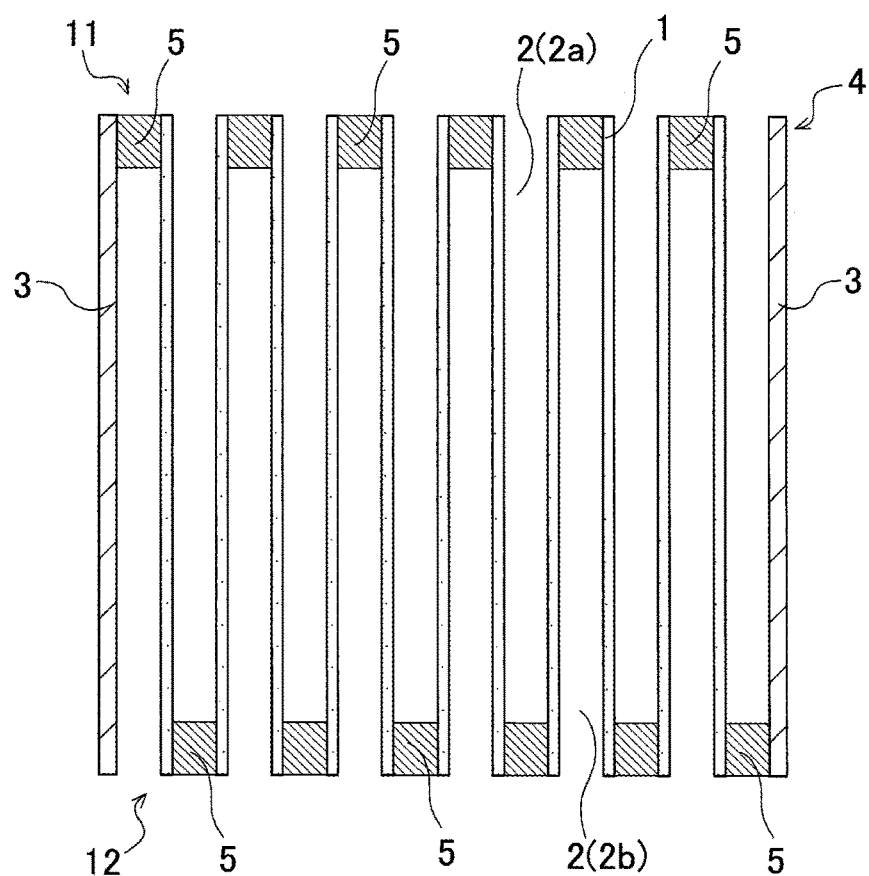
FIG. 3 is a sectional view schematically showing a section taken along the line A-A' of FIG. 2.

As shown in FIG. 1 to FIG. 3, a first embodiment of a honeycomb filter according to the present invention is the honeycomb filter 100 that includes a honeycomb structure body 4 and plugging portions 5. The honeycomb structure body 4 is a pillar-shaped structure including a porous partition wall 1 disposed so as to surround a plurality of cells 2 serve as fluid through channels extending from a first end face 11 to a second end face 12. In the honeycomb filter 100, the honeycomb structure body 4 is pillar-shaped and further includes a circumferential wall 3 on its circumferential side face. In other words, the circumferential wall 3 is disposed to encompass the partition wall 1 disposed in a grid pattern.

The plugging portions 5 are disposed at open ends on the first end face 11 side or the second end face 12 side of each of the cells 2. In the honeycomb filters 100 shown in FIGS. 1 to 3, the plugging portions 5 are provided at the open ends on the first end face 11 side of predetermined cells 2 and at open ends on the second end face 12 side of the remaining cells 2, respectively. If the first end face 11 is defined as the inflow end face, and the second end face 12 is defined as the outflow end face, then the cells 2 which have the plugging portions 5 disposed at the open ends on the outflow end face side and which have the inflow end face side open are defined as inflow cells 2a. Further, the cells 2 which have the plugging portions 5 disposed at the open ends on the inflow end face side and which have the outflow end face side open are defined as outflow cells 2b. The inflow cells 2a and the outflow cells 2b are preferably arranged alternately with the partition wall 1 therebetween. This, in addition, preferably forms a checkerboard pattern by the plugging portions 5 and "the open ends of the cells 2" on both end faces of the honeycomb filter 100.

FIG. 1 is a perspective view schematically showing one embodiment of the honeycomb filter according to the present invention as viewed from an inflow end face side. FIG. 2 is a plan view of the honeycomb filter shown in FIG. 1 as viewed from the inflow end face side. FIG. 3 is a sectional view schematically showing a section taken along the line A-A' of FIG. 2.

The honeycomb filter 100 has a particularly critical configuration with respect to a pore diameter distribution of the partition wall 1 constituting the honeycomb structure body 4. That is, the honeycomb filter 100 satisfies all of the following equations (1) to (6) in the pore diameter distribution of the partition wall 1 obtained by structural analysis. Here, in the following equations (1) to (6), D10 represents the pore diameter (μm) at which the cumulative pore volume in the pore diameter distribution is 10% of the total pore volume. D50 represents the pore diameter (μm) at which the cumulative pore volume in the pore diameter distribution is 50% of the total pore volume. D90 represents the pore diameter (μm) at which the cumulative pore volume in the pore diameter distribution is 90% of the total pore volume. The cumulative pore volume to the total pore volume is an integrated value of the pore volume starting from a minimum value of the pore diameter (for example, 0 μm).

$$8.4 \ \mu m < D10 \tag{1}$$

$$17.5 \ \mu m < D50 < 24.0 \ \mu m \tag{2}$$

$$D90 < 55.2 \ \mu m \tag{3}$$

$$(\log D90 - \log D10)/\log D50 < 0.60 \tag{4}$$

$$\log D90/\log D50 < 1.30 \tag{5}$$

$$\log D50/\log D10 < 1.38 \tag{6}$$

The honeycomb filter 100 of the present embodiment has excellent trapping performance and can reduce pressure loss. In particular, as in the above equation (1), by setting D10 in the pore diameter distribution to be high to reduce small pores, the transmission resistivity of the partition wall 1 becomes low, and it is possible to effectively suppress an increase in pressure loss of the honeycomb filter 100. In particular, in the honeycomb filter 100 of the present embodiment, when a porous partition wall 1 is loaded with a catalyst for purifying exhaust gas, the catalyst is loaded such that the inside of pores of the partition wall 1 is uniformly coated. By loading the catalyst in this manner, it is possible to achieve both the improvement in trapping performance and the reduction in pressure loss of the honeycomb filter 100 that is loaded with the catalyst. For example, when the value of D10 is 8.4 µm or less, it is difficult to suppress an increase in pressure loss of the honeycomb filter 100. The upper limit value of D10 is not particularly limited as long as the upper limit value satisfies the above equations (4) and (6).

The value of D10 is not particularly limited as long as it satisfies the above equation (1) and satisfies the above equations (4) and (6), but the value of D10 is preferably greater than 8.4 µm, and more preferably greater than 8.5 µm.

In addition, as in the above equation (3), by setting D90 in the pore diameter distribution to be low to reduce large pores, it is possible to suppress a local increase in the flow rate of the fluid passing through the partition wall 1, and to improve the filtration efficiency of the honeycomb filter 100. For example, the lower limit value of D90 is not particularly limited as long as it satisfies the above equations (4) to (6). On the other hand, when the value of D90 is 55.2 µm or more, the filtration efficiency of the honeycomb filter may decrease.

The value of D90 is not particularly limited as long as it satisfies the above equation (3) and satisfies the above equations (4) to (6), but the value of D90 is preferably less than 55.2 µm, and more preferably less than 53.0 µm.

Further, as in the above equation (2), by setting D50 in the pore diameter distribution to a predetermined numerical range, an improvement in the filtration efficiency and a suppression of an increase in pressure loss of the honeycomb filter 100 can be expected. For example, when the value of D50 is 17.5 µm or less, it is not preferable in terms of increasing pressure loss. On the other hand, when the value of D50 is 24.0 µm or more, it is not preferable in terms of lowering the filtration efficiency.

The value of D50 is not particularly limited as long as it satisfies the above equation (2) and satisfies the above equations (4) and (5), but the value of D50 is preferably greater than 18.7 µm and less than 22.4 µm.

Further, by configuring as in the above equations (4) to (6), an improvement in the filtration efficiency and a suppression of an increase in pressure loss of the honeycomb filter 100 can be expected. Noted that "log D10", "log D50", and "log D90" in the equations (4) to (6) are logarithms of D10, D50 and D90 with a base 10.

For example, when the value of "(log D90−log D10)/log D50)" in the equation (4) is less than 0.60 or more, an improvement in the filtration efficiency and a suppression of an increase in pressure loss of the honeycomb filter 100 can be expected. When the value of "log D90/log D50" in the equation (5) is less than 1.30 less, an improvement in the filtration efficiency of the honeycomb filter 100 can be expected. When the value of "log D50/log D10" in the equation (6) is less than 1.38 less, an increase in pressure loss of the honeycomb filter 100 can be expected.

In the present invention, the "pore diameter distribution of the partition wall 1 obtained by structural analysis" means a pore diameter distribution obtained by the structural analysis by the following analysis method. In other words, it means a pore diameter distribution obtained by analysis using "Granulometry function" which is one of the interface modules of "GeoDict (trade name (the same shall apply hereinafter)" which is the microstructure simulation software developed by Math2Market GmbH of Germany. Hereinafter, an "analysis method using Granulometry function" is sometimes referred to as "Granulometry analysis method". Therefore, the "pore diameter distribution of the partition wall 1" in the honeycomb filter 100 of the present embodiment refers to the pore diameter distribution of the partition wall 1 obtained by the Granulometry analysis method. The pore diameter distribution of the partition wall 1 obtained by the Granulometry analysis method can more accurately analyze the pore diameter inside the partition wall 1. That is, inside the partition wall 1, even when there is a part where the diameter of the pore is enlarged or a constricted part (that is, a neck), the pore diameter thereof can be appropriately determined. Therefore, the pore diameter inside the partition wall 1 which has been difficult to accurately measure by the conventional mercury press-in method, in particular, the pore diameter inside the neck of the pore can be obtained more accurately.

Here, the "Granulometry analysis method" for obtaining the pore diameter distribution of the partition wall 1 will be described. Hereinafter, the "Granulometry analysis method" may be simply referred to as "the analysis method". In the analysis method, a tomogram of the partition wall 1 of the honeycomb filter 100 is acquired with the X-ray CT device, and the pore diameter distribution of the partition wall 1 is obtained from a three-dimensional partition wall structural model of the acquired tomogram.

Specifically, first, a part of the partition wall 1 is cut out from the honeycomb filter 100 to prepare a partition wall sample piece for analysis. However, the part where the plugging portion 5 is present shall be excluded from the partition wall sample piece. The partition wall sample piece is collected at the center position both in a direction extending from the first end face 11 to the second end face 12 of the honeycomb filter 100 (hereinafter, also referred to as an "axial direction X") and in a direction orthogonal to the axial direction X. The partition wall sample piece has a rectangular parallelepiped shape in which a length in the axial direction X is about 1 cm, a width in a surface direction of the partition wall 1 orthogonal to the axial direction X is about 0.5 cm, and a thickness orthogonal to both the length and the width is a thickness of the partition wall 1.

Next, the prepared partition wall sample piece is resin-embedded while vacuum degassing to obtain an X-ray CT imaging sample. "CT" is an abbreviation for Computed Tomography. The X-ray CT device is used to acquire a continuous tomographic image of the sample under the imaging conditions of Voltage 60 kV, Step 0.1°, and Resolution 1.2 µm/pixel. The continuous tomographic image is a continuous tomographic image in TIFF (Tagged Image File Format). The obtained continuous tomographic images in TIFF are read using the "Granulometry function" of the "PoroDict function" which is one of the modules of "GeoDict" which is the microstructure simulation software developed by Math2Market GmbH under the condition of 1.2 µm/voxel.

Figure 4:
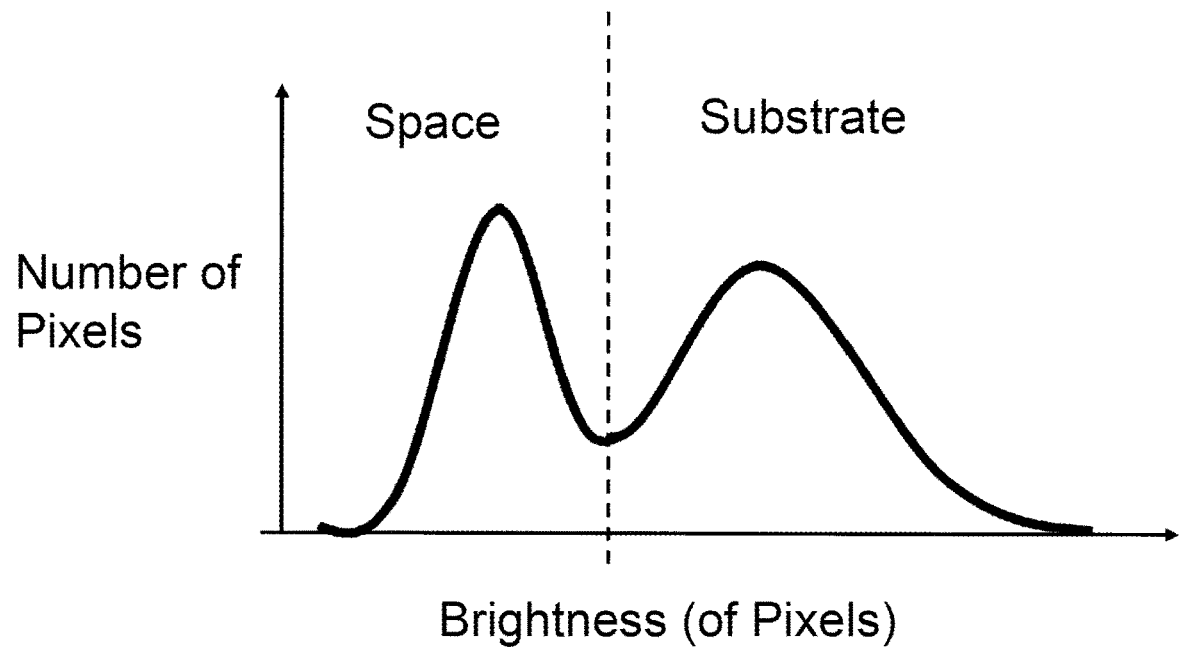
FIG. 4 is a diagram showing an example of a gray value diagram used in measuring the number of communication pores in a partition wall.

Next, in order to separate the skeleton part and the space part of the read image, the partition wall sample piece is three-dimensionally modeled using the intersection part when separating into two peaks in the gray value diagram as shown in FIG. 4 as a threshold.

Then, noises in the three-dimensional model are removed, and unnecessary parts are removed so as to be in 400 voxel×400 voxel×partition wall thickness voxel. Next, the size of the pore in the three-dimensional partition wall structural model M is derived using the "Granulometry function" of the "PoroDict function" which is one of the modules of GeoDict. The calculation method by the Granulometry function of GeoDict is a method in which a sphere along the size of the pore is fitted to each pore.

By analyzing the partition wall structural model M with the Granulometry function described above, the pore diameter distribution and the values of D10, D50, and D90 can be obtained. Note that, as the "Granulometry function", the "Granulometry function (2020 edition)" in the above-described module of the "GeoDict" is used. The "Granulometry function (2020 edition)" indicates the year (A.D.) in which the Granulometry function was provided. Therefore, the analysis method is based on the analysis results using the Granulometry function provided in 2020 A. D. Here, the 2020 edition indicates the year (A.D.) when the Granulometry function was provided in Japan, but this does not apply if it is clear that the same analysis results can be obtained. In addition, if it is clear that the Granulometry function provided in other than 2020 (e.g., before or after 2020) show the same analysis results as the Granulometry function (2020 edition) described above, they may be used for analysis.

In the honeycomb filter 100 of the present embodiment, the values of D10, D50 and D90 in the pore diameter distribution of the partition wall 1 obtained by the analysis method described above satisfy the above equations (1) to (6). Conventionally, as the pore diameter distribution of the partition wall 1, a pore diameter distribution measured by a mercury press-in method and the like are widely known. However, the pore diameter distribution measured by the mercury press-in method and the values such as a pore diameter determined by the pore diameter distribution depend on the diameter of the neck on an inlet. Since the pore diameter inside cannot be accurately measured, the honeycomb filter 100 may not be well specified. On the other hand, the honeycomb filter 100 of the present embodiment is based on the finding that the above-described neck diameter and the like greatly contribute to the improvement of the filtration efficiency and the suppression of pressure loss. Since the neck diameter cannot be accurately measured by the mercury press-in method as described above, the pore diameter distribution of the partition wall 1 is specified using the analysis method described above. Therefore, as in the honeycomb filter 100 of the present embodiment, by managing the values of D10, D50 and D90 based on the pore diameter distribution of the partition wall 1 determined by the analysis method, it is possible to obtain particularly excellent properties in terms of improving the filtration efficiency and suppressing the increase in pressure loss as compared with a conventional honeycomb filter.

The honeycomb filter 100 preferably has a porosity of the partition wall 1 of greater than 60.0% and less than 63.5%. In the present invention, the porosity of the partition wall 1 is a value determined by structural analysis. Specifically, the porosity of the partition wall 1 is a value measured by Open and Closed Porosity method of the "PoroDict function", which is one of the modules of the "GeoDict" described above. By setting the porosity of the partition wall 1 to greater than 60.0% and less than 63.5%, pressure loss can be reduced. When the porosity of the partition wall 1 is 60.0% or less, pressure loss of the honeycomb filter 100 may not be sufficiently reduced. On the other hand, when the porosity of the partition wall 1 is 63.5% or more, the mechanical strength of the honeycomb filter 100 may be deteriorated. The porosity of the partition wall 1 is more preferably greater than 60.0% and less than 63.5%, particularly preferably greater than 62.4% and less than 63.3%. The partition wall structural model M in determining the porosity of the partition wall 1 can be obtained in the same manner as the "Granulometry analysis method" for determining the pore diameter distribution of the partition wall 1 described above.

The thickness of the partition wall 1 is not particularly limited, but is preferably greater than 177.8 µm and less than 254.0 µm, more preferably greater than 190.4 µm and less than 254.0 µm, and particularly preferably greater than 190.4 µm and less than 216.0 µm, for example. The thickness of the partition wall 1 can be measured with a scanning electron microscope or a microscope, for example. If the thickness of the partition wall 1 is too thin, it is not preferable in terms of trapping performance degradation. On the other hand, if the thickness of the partition wall 1 is too thick, it is not preferable in terms of increasing pressure loss.

The cell density of the cells 2 defined by the partition wall 1 is preferably greater than 31.0 cells/cm$^2$ and less than 62.0 cells/cm$^2$, more preferably greater than 31.0 cells/cm$^2$ and less than 55.0 cells/cm$^2$. With this configuration, the honeycomb filter 100 can be preferably used as a filter for purifying exhaust gas emitted from an automobile engine.

The shape of the cells 2 formed in the honeycomb structure body 4 is not particularly limited. For example, the shape of the cells 2 in a section that is orthogonal to the extending direction of the cells 2 may be a polygonal shape, a circular shape, an elliptical shape, and the like. The polygonal shape can include a triangle, a quadrangle, a pentagon, a hexagon, an octagon, and the like. The shape of the cells 2 is preferably a triangle, a quadrangle, a pentagon, a hexagon or an octagon. In the present invention, the cells 2 mean the spaces surrounded by the partition wall 1.

Regarding the shape of the cells 2 formed in the honeycomb structure body 4, all the cells 2 may have the same shape or different shapes. For example, although not shown, quadrangular cells and octagonal cells may be mixed. For example, the shape of the outflow cell may be different from the shape of the inflow cell in a section orthogonal to the extending direction of the cells of the honeycomb structure body. In such an embodiment, for example, it is preferable that the shape of the outflow cell is one of a quadrangle and an octagon, and the shape of the inflow cell is the other of a quadrangle and an octagon.

In addition, regarding the size of the cells 2 formed in the honeycomb structure body 4, all the cells 2 may have the same size or different sizes. For example, although not shown, among the plurality of cells, some cells may made to be large, and other cells may be made to be relatively smaller.

The circumferential wall 3 of the honeycomb structure body 4 may be configured integrally with the partition wall 1 or may be composed of a circumferential coat layer formed by applying a circumferential coating material to the circumferential side of the partition wall 1. For example, although not shown, the circumferential coat layer can be provided on the circumferential side of the partition wall after the partition wall and the circumferential wall are integrally formed and then the formed circumferential wall is removed by a well-known method, such as grinding, in a manufacturing process.

The shape of the honeycomb structure body 4 is not particularly limited. The shape of the honeycomb structure body 4 can be a pillar-shape in which the shape of the first end face 11 (for example, the inflow end face) and the second end face 12 (for example, the outflow end face) includes a circular shape, an elliptical shape, a polygonal shape or the like.

The size of the honeycomb structure body 4, for example, the length from the first end face 11 to the second end face 12, and the size of a section orthogonal to the extending direction of the cells 2 of the honeycomb structure body 4, is not particularly limited. Each size may be selected as appropriate such that optimum purification performance is obtained when the honeycomb filter 100 is used as a filter for purifying exhaust gas.

The material of the partition wall 1 is not particularly limited, and any porous material having a pore diameter distribution satisfying the above equations (1) to (6) may be used. For example, the material of the partition wall 1 preferably contains at least one selected from the group consisting of silicon carbide, cordierite, silicon-silicon carbide composite material, cordierite-silicon carbide composite material, silicon nitride, mullite, alumina, and aluminum titanate. The material constituting the partition wall 1 is preferably a material including 90% by mass or more of the materials listed in the above group, is further preferably a material including 92% by mass or more of the materials listed in the above group, and is particularly preferably a material including 95% by mass or more of the materials listed in the above group. The silicon-silicon carbide composite material is a composite material formed using silicon carbide as an aggregate and silicon as a bonding material. The cordierite-silicon carbide composite material is a composite material formed using silicon carbide as an aggregate and cordierite as a bonding material. In the honeycomb filter 100 of the present embodiment, the material constituting the partition wall 1 is particularly preferably cordierite.

The material of the plugging portions 5 is preferably a material that is preferred as the material of the partition wall 1. The material of the plugging portions 5 and the material of the partition wall 1 may be the same or different.

In the honeycomb filter 100, the partition wall 1 defining the plurality of cells 2 is preferably loaded with a catalyst for purifying exhaust gas. Loading the partition wall 1 with a catalyst refers to coating the catalyst onto the surface of the partition wall 1 and the inner walls of the pores formed in the partition wall 1. This configuration makes it possible to turn CO, NOx, HC and the like in exhaust gas into harmless substances by catalytic reaction. In addition, the oxidation of PM of trapped soot or the like can be accelerated. In the honeycomb filter 100 of the present embodiment, it is particularly preferable that the catalyst is loaded inside the pores of the porous partition wall 1. With such a configuration, it is possible to achieve both improvement in trapping performance and reduction in pressure loss after loading the catalyst at low catalyst amounts. Further, after loading the catalyst, the flow of gases becomes uniform, so that the purification performance can be expected to be improved.

The catalyst with which the partition wall 1 is loaded is not particularly limited. For example, a catalyst containing a platinum group element and containing an oxide of at least one element among aluminum, zirconium, and cerium can be exemplified.

(2) Manufacturing Method of Honeycomb Filter

Next, a manufacturing method of the honeycomb filter of the present embodiment will be described. The honeycomb filter of the present embodiment can be manufactured, for example, by the following methods. First, a plastic kneaded material is prepared to make a honeycomb structure body. The kneaded material for making honeycomb structure body can be prepared, for example, as follows. Talc, kaolin, alumina, aluminum hydroxide, and porous silica are used as raw material powders, and water-absorbing polymer, binder, surfactant, and water as organic pore formers are added to the raw material powders to prepare a plastic kneaded material. In particular, by adjusting the blending ratio of the raw material powder and the organic pore former in the preparation of the kneaded material, the obtained partition wall can have a pore diameter distribution that satisfies the above equations (1) to (6).

Next, the kneaded material thus obtained is subjected to extrusion so as to make a honeycomb formed body having a partition wall defining a plurality of cells, and an outer wall disposed to encompass the partition wall.

The obtained honeycomb formed body is dried by, for example, microwave and hot air, and the open ends of the cells are plugged using the same material as the material used for making honeycomb formed body, thereby making plugging portions. The honeycomb formed body may be further dried after making the plugging portions.

Next, a honeycomb filter is manufactured by firing the honeycomb formed body in which the plugging portions were made. A firing temperature and a firing atmosphere are different depending on the raw material, and those skilled in the art can select the firing temperature and the firing atmosphere that are the most suitable for the selected material.

According to the manufacturing method described above, it is possible to manufacture a honeycomb filter having a partition wall in which a pore diameter distribution satisfying the above equations (1) to (6) is realized.

EXAMPLES

The following describes the present invention more specifically by examples, but the present invention is not limited to those examples.

Example 1

Talc, kaolin, alumina, aluminum hydroxide and porous silica were prepared as a forming raw material for preparing a kneaded material. The cumulative particle size distribution of each raw material was measured using a laser diffraction/scattering type particle diameter distribution measurement device (trade name: LA-960) manufactured by HORIBA, Ltd. In Example 1, the raw materials were blended to prepare the cordierite forming raw material such that the blending ratios (parts by mass) of the raw materials exhibited the values shown in Table 1. In Table 1, the horizontal row of "Particle size D50 (µm)" shows the particle diameter of 50% by volume (i.e., a median diameter) of each raw material.

Next, a kneaded material was prepared by adding 3.0 parts by mass of a water-absorbing polymer as a pore former, 6 parts by mass of a binder, 1 part by mass of a surfactant, and 80 parts by mass of water to 100 parts by mass of the forming raw material. As the pore former, a water-absorbing polymer having a particle diameter of 30 µm was used. As the binder, methylcellulose was used. As a dispersing agent, a potassium laurate soap was used. Table 2 shows the blending ratios (parts by mass) of the pore former (organic pore former) and other raw materials. In Table 2, the horizontal row of "Particle size D50 (µm)" shows the particle diameter of 50% by volume (i.e., the median diameter) of the organic pore formers. Further, the blending ratio (parts by mass) shown in Table 2 shows the ratio with respect to 100 parts by mass of the cordierite forming raw material.

Next, the obtained kneaded material was molded using an extruder to make a honeycomb formed body. Next, the obtained honeycomb formed body was dried by high frequency dielectric heating, and then further dried using a hot air dryer. The shape of the cells in the honeycomb formed body was quadrangular.

Next, the plugging portions were formed in the dried honeycomb formed body. First, the inflow end face of the honeycomb formed body was masked. Next, the end portion provided with the mask (the end portion on the inflow end face side) was immersed in the plugging slurry, and the open ends of the cells without the mask (the outflow cells) were filled up with the plugging slurry. In this way, the plugging portions were formed on the inflow end face side of the honeycomb formed body. Then, the plugging portions were also formed in the inflow cells in the same manner for the outflow end face of the dried honeycomb formed body.

Next, the honeycomb formed body in which the plugging portions have been formed was dried with a microwave dryer, and further dried completely with a hot air dryer, and then both end faces of the honeycomb formed body were cut and adjusted to a predetermined size. The dried honeycomb formed body was then degreased and fired to manufacture the honeycomb filter of Example 1.

The honeycomb filter of Example 1 had the diameter of the end faces of 228.6 mm and the length in the extending direction of the cells of 184.2 mm. Further, the thickness of the partition wall was 190.5 μm and the cell density was 54.3 cells/cm$^2$. The thickness of the partition wall and the cell density are shown in Table 3.

On the honeycomb filter of Example 1, the porosity of the partition wall was measured in the following method. The porosity of the partition wall was 63.2%. The measurement results are shown in Table 3.

(Porosity)

The porosity of the partition wall was measured using Open and Closed Porosity of the PoroDict function, which is one of the modules of the "GeoDict". The specific analysis method is the same as the analysis method described in the present embodiment. The three-dimensional model and the partition wall structural model M were obtained in the same manner as the "Granulometry analysis method" for obtaining the pore diameter distribution described in the present embodiment.

In addition, the pore diameter distribution of the partition wall in the honeycomb filter of Example 1 was determined by the Granulometry analysis method, and the values of D10, D50 and D90 were determined based on the obtained pore diameter distribution (analysis values). Note that D10 indicates the pore diameter (μm) whose cumulative pore volume is 10% of the total pore volume, and D50 indicates the pore diameter (μm) whose cumulative pore volume is 50% of the total pore volume, and D90 indicates the pore diameter (μm) whose cumulative pore volume is 90% of the total pore volume. A series of analyses by the Granulometry analysis method was performed by the method described above, and "GeoDict (trade name)" which is a microstructure simulation software developed by Math2Market GmbH was used in the analysis. The determined values of D10, D50 and D90 are shown in Table 3. The values of "(log D90-log D10)/log D50", "log D90/log D50" and "log D50/log D10" were obtained from the values of D10, D50 and D90. These values are shown in the columns of "Equation (4)", "Equation (5)", and "Equation (6)" in Table 3.

TABLE 1

| | Blending ratio of Cordierite forming raw material (parts by mass) | | | | | | |
|---|---|---|---|---|---|---|---|
| | Talc | Kaolin | Alumina | Aluminum hydroxide | Fused silica | Porous silica |
| Particle size D50(μm) | 10 | 20 | 5 | 6 | 1 | 3 | 25 | 20 |
| Comparative Example 1 | — | 40 | 14 | 11 | 22 | — | 13 | — |
| Comparative Example 2 | — | 40 | 17 | 14 | — | 15 | — | 14 |
| Example 1 | 40 | — | 17 | 14 | — | 15 | — | 14 |
| Example 2 | 40 | — | 17 | 14 | — | 15 | — | 14 |
| Example 3 | 40 | — | 17 | 14 | — | 15 | — | 14 |

TABLE 2

| | Blending ratio of Organic pore former (parts by mass) | | Blending ratio of other raw materials (parts by mass) | | |
|---|---|---|---|---|---|
| Material | Foamable resin | Water-absorbing polymer | Binder | Surfactant | Water |
| Particle size D50(μm) | 45 | 25 | 30 | — | — | — |
| Comparative Example 1 | 10 | 0.5 | — | 6.0 | 1 | 26 |
| Comparative Example 2 | — | — | 3.0 | 6.0 | 1 | 80 |
| Example 1 | — | — | 3.0 | 6.0 | 1 | 80 |
| Example 2 | — | — | 3.0 | 6.0 | 1 | 82 |
| Example 3 | — | — | 4.0 | 6.0 | 1 | 88 |

TABLE 3

|  | D10 (μm) | D50 (μm) | D90 (μm) | Equation (4) | Equation (5) | Equation (6) | Porosity (%) | Partition wall Thickness (μm) | Cell density (cells/cm²) |
|---|---|---|---|---|---|---|---|---|---|
| Comparative Example 1 | 10.6 | 26.0 | 70.0 | 0.58 | 1.30 | 1.38 | 65.4 | 215.9 | 38.8 |
| Comparative Example 2 | 10.0 | 24.1 | 67.3 | 0.60 | 1.32 | 1.38 | 63.4 | 241.3 | 38.8 |
| Example 1 | 8.5 | 18.8 | 43.6 | 0.56 | 1.29 | 1.37 | 63.2 | 190.5 | 54.3 |
| Example 2 | 8.8 | 19.3 | 43.5 | 0.54 | 1.27 | 1.36 | 62.5 | 203.2 | 46.5 |
| Example 3 | 10.5 | 22.3 | 52.9 | 0.52 | 1.28 | 1.32 | 62.8 | 215.9 | 38.8 |

TABLE 4

|  | Pressure loss ratio Determination | Filtration efficiency (Soot number ratio) Determination |
|---|---|---|
| Comparative Example 1 | Reference | Reference |
| Comparative Example 2 | Fail | Acceptable |
| Example 1 | Excellent | Excellent |
| Example 2 | Good | Excellent |
| Example 3 | Acceptable | Good |

On the honeycomb filter of Example 1, the pressure loss and the filtration efficiency were evaluated for in the following method. The results are shown in Table 4.

(Pressure Loss)

Exhaust gas emitted from 6.7 L diesel engine was allowed to flow into the honeycomb filters of each Example and Comparative Example, and the soot in exhaust gas was trapped at the partition wall of the honeycomb filter. The soot trapping was performed until the soot deposition amount per unit volume (1 L) of the honeycomb filter was 3 g/L. Then, when the soot deposition amount was 3 g/L, engine exhaust gas at 200° C. was allowed to flow into the honeycomb filter at a flow rate of 12 m³/min, and the pressures on the inflow end face side and the outflow end face side were measured. Then, the pressure loss (kPa) of the honeycomb filter was determined by calculating the pressure difference between the inflow end face side and the outflow end face side. Then, the pressure loss ratio (%) of each honeycomb filter was calculated when the value of the pressure loss of the honeycomb filter of Comparative Example 1 was defined as 100%, and the honeycomb filter of each Example and Comparative Example was evaluated based on the following evaluation criteria. In the following criteria, "Pressure loss ratio (%)" refers to the ratio (%) of the pressure loss of each honeycomb filter when the value of the pressure loss of the honeycomb filter of Comparative Example 1 is defined as 100%.

Evaluation "Excellent": If the pressure loss ratio (%) is 96% or less, the evaluation is determined as "Excellent".

Evaluation "Good": If the pressure loss ratio (%) is greater than 96% and 98% or less, the evaluation is determined as "Good".

Evaluation "Acceptable": If the pressure loss ratio (%) is greater than 98% and 100% or less, the evaluation is determined as "Acceptable".

Evaluation "Fail": If the pressure loss ratio (%) exceeds 100%, the evaluation is determined as "Fail".

(Filtration Efficiency)

First, exhaust gas purification devices were fabricated by using the honeycomb filters of Examples and Comparative Examples as the exhaust gas purifying filters. Next, each of the fabricated exhaust gas purification devices was connected to an outlet side of an exhaust manifold of 6.7 L diesel engine, and the number of soot particles contained in the gas emitted from the outlet port of the exhaust gas purification device was measured by the PN measurement method. In the determination of the number of soot particles, the cumulative number of soot particles emitted after the driving in the WHTC (World Harmonized Transient Cycle) mode was taken as the number of soot particles of the exhaust gas purification device to be determined, the soot number ratio (%) of each honeycomb filter was calculated when the number of soot particles of the exhaust gas purification device using the honeycomb filter of Comparative Example 1 was defined as 100%, and the honeycomb filters of each Example and Comparative Example were evaluated based on the following evaluation criteria. The columns of "Determination" of "Filtration efficiency (Soot number ratio (%))" in Table 4 indicate the determined results based on the following evaluation criteria.

Evaluation "Excellent": If the soot number ratio (%) is 50% or less, the evaluation is determined as "Excellent".

Evaluation "Good": If the soot number ratio (%) is greater than 50% and 80% or less, the evaluation is determined as "Good".

Evaluation "Acceptable": If the soot number ratio (%) is greater than 80% and 100% or less, the evaluation is determined as "Acceptable".

Evaluation "Fail": If the soot number ratio (%) exceeds 100%, the evaluation is determined as "Fail".

Examples 2 and 3

In Examples 2 and 3, the blending ratio (parts by mass) of the raw materials used for the cordierite forming raw material was changed as shown in Table 1. In addition, the blending ratios (parts by mass) of the organic pore former and other raw materials were also changed as shown in Table 2. Except that these raw materials were used to prepare the kneaded material, the honeycomb filters were manufactured by the same method as that of Example 1.

Comparative Examples 1 and 2

In Comparative Examples 1 and 2, the blending ratio (parts by mass) of the raw materials used for the cordierite forming raw material was changed as shown in Table 1. In addition, the blending ratios (parts by mass) of the organic pore former and other raw materials were also changed as shown in Table 2. Except that these raw materials were used to prepare the kneaded material, the honeycomb filters were manufactured by the same method as that of Example 1.

On the honeycomb filters of Examples 2 and 3 and Comparative Examples 1 and 2, the porosity of the partition wall was measured in the same manner as in Example 1. In addition, on the honeycomb filters of Examples 2 and 3 and Comparative Examples 1 and 2, the pore diameter distributions of the partition wall were determined by the Granulometry analysis method, and the values of D10, D50 and D90 were determined based on the obtained pore diameter distribution (analysis values). The results are shown in Table 3.

On the honeycomb filters of Examples 2 and 3 and Comparative Examples 1 and 2, the pressure loss and the filtration efficiency were evaluated in the same manner as in Example 1. The results are shown in Table 4.

Results

It was confirmed that the honeycomb filters of Example 1 to 3 exceeded the respective performances of the honeycomb filter of Comparative Example 1, which provides the reference, in all evaluations of pressure loss and filtration efficiency. The honeycomb filter of Comparative Example 1 does not satisfy the relational equations of Equations (2) and (3) and Equations (5) and (6) described above. It was found that the honeycomb filters of Examples 1 to 3 have excellent trapping performance and can suppress an increase in pressure loss as compared with the conventional honeycomb filter of Comparative Example 1. On the other hand, the honeycomb filter of Comparative Example 2 did not satisfy the relational equations of Equations (2) to (6) described above. In such a honeycomb filter of Comparative Example 2, deterioration of pressure loss was severe.

INDUSTRIAL APPLICABILITY

The honeycomb filter according to the present invention can be used as a trapping filter for removing particulates and the like contained in exhaust gas.

DESCRIPTION OF REFERENCE NUMERALS

1: partition wall, 2: cell, 2a: inflow cell; 2b: outflow cell; 3: circumferential wall; 4: honeycomb structure body; 5: plugging portion; 11: first end face; 12: second end face; and 100: honeycomb filter.

What is claimed is:

1. A honeycomb filter comprising:
a pillar-shaped honeycomb structure body having porous partition walls disposed to surround a plurality of cells which serve as fluid through channels extending from a first end face to a second end face; and
plugging portions provided at an open end on a first end face side or a second end face side of each cell of the plurality of cells,
wherein, in a pore diameter distribution of the porous partition walls obtained by structural analysis, in a case where a pore diameter (μm) whose cumulative pore volume is 10% of a total pore volume is denoted by D10, a pore diameter (μm) whose cumulative pore volume is 50% of the total pore volume is denoted by D50, and a pore diameter (μm) whose cumulative pore volume is 90% of the total pore volume is denoted by D90, all of the following equations (1) to (6) are satisfied $$8.5 \text{ μm} \leq D10 \leq 10.5 \text{ μm} \tag{1}$$

$$18.8 \text{ μm} \leq D50 \leq 22.3 \text{ μm} \tag{2}$$

$$43.5 \text{ μm} \leq D90 \leq 52.9 \text{ μm} \tag{3}$$

$$0.52 \leq (\log D90 - \log D10)/\log D50 < 0.56 \tag{4}$$

$$1.27 \leq \log D90/\log D50 < 1.29 \tag{5}$$

$$1.32 \leq \log D50/\log D10 < 1.37 \tag{6}$$

wherein a porosity of the porous partition walls determined by structural analysis is greater than 62.4% and less than 63.3%, and
wherein a thickness of the porous partition walls is greater than 190.4 μm and less than 216 μm.

2. The honeycomb filter according to claim 1, wherein a cell density of the honeycomb structure body is greater than 31.0 cells/cm$^2$ and less than 62.0 cells/cm$^2$.

3. The honeycomb filter according to claim 1, wherein a cell of the plurality of cells plugged by the plugging portion at the open end on the first end face side of the honeycomb structure body is an outflow cell, and a cell of the plurality of cells plugged by the plugging portion at the open end on the second end face side of the honeycomb structure body is an inflow cell, in a section orthogonal to an extending direction of the plurality of cells of the honeycomb structure body, a shape of the outflow cell differs from a shape of the inflow cell.

4. The honeycomb filter according to claim 3, wherein the shape of the outflow cell is one of a quadrangular shape and an octagonal shape, and the shape of the inflow cell is the other of a quadrangular shape and an octagonal shape.

\* \* \* \* \*